United States Patent Office 3,756,973
Patented Sept. 4, 1973

3,756,973
DISPERSION FOR WATER-REPELLENT COATINGS
Roland Edgar Stahl, Wilmington, Del., assignor to E. I. du Pont de Nemours and Company, Wilmington, Del.
No Drawing. Filed Sept. 20, 1971, Ser. No. 182,195
Int. Cl. C08f 45/24, 45/52; C09d 5/02
U.S. Cl. 260—28.5 R                             9 Claims

ABSTRACT OF THE DISCLOSURE

A storage-stable aqueous dispersion, from which a rapid-curing, water-repellent coating can be applied, is provided. The essential ingredients of the dispersion comprise a copolymer of ethylene and an alpha,beta-ethylenically unsaturated carboxylic acid, a wax, and a low molecular weight, water-soluble methylated melamine-formaldehyde resin. An article comprising a fabric having thereon a coating of the dispersed phase of the dispersion and a process for preparing the article are also provided.

BACKGROUND OF THE INVENTION

Field of invention

This invention relates to aqueous dispersions of ethylene copolymers and wax which produce water-repellent coatings.

Prior art

Wax containing compositions as water-repellent coatings are well known, as indicated by such sources as "Waterproofing Textiles—1970," M. W. Ranney, Editor, Noyes Data Corporation, Park Ridge, New Jersey. Such coatings tend to have certain disadvantageous characteristics: (1) a slippery feel or hand, making the finish feel almost wet, (2) crocking (tendency of the coating to rub off) is generally poor, (3) coating weights are usually relatively heavy; the coating weight is usually about one-half or more of the fabric weight, and (4) when coatings are applied from a hydrocarbon solvent, there are problems due to toxicity to workers, atmospheric pollution, and flammability.

More recently aqueous coatings based on ethylene copolymer/wax dispersions have been developed. Such coatings offer beneficial properties: (1) dry hand, (2) improved dry crock resistance, (3) lower coating weights, one-fourth to one-third of the fabric weight, (4) hydrocarbon solvents are eliminated. Copending application Ser. No. 130,842 discloses such an aqueous dispersion having an ethylene copolymer comprising at least 30 percent by weight ethylene and up to 70 percent by weight of at least one comonomer having polar characteristics, a wax, an ammonium salt of a mineral acid, and from 0 to 25 percent by weight of an amino-formaldehyde resin, such as hexamethoxymethylmelamine. Although that system represents an improvement over the prior art, it too has two disadvantages in commercial operation: (1) curing tends to be slow on commercial equipment and thus economically undesirable, and (2) compositions tend to thicken on standing. The thickening process can cause difficulty in applying coatings with a pattern box, or it may proceed to the point where the coating is completely coagulated. These problems have been overcome by the present invention.

SUMMARY OF THE INVENTION

According to the present invention there is provided a storage-stable aqueous dispersion comprising as essential ingredients: an ethylene copolymer comprising at least 30 percent by weight ethylene and up to 70 percent by weight of an alpha,beta-ethylenically unsaturated carboxylic acid having about 0 to 75 percent of its acid groups neutralized with alkali metal ions, a wax, and a water-soluble, low molecular weight methylated melamine-formaldehyde resin. The prior art problems of slow curing and thickening are overcome by using low molecular weight methylated melamine-formaldehyde resin in place of hexamethoxymethylmelamine and by deletion of the curing catalyst, ammonium salt of a mineral acid. Use of the low molecular weight methylated melamine-formaldehyde resin permits an increased rate of curing. This resin also permits curing without catalysts, ammonium salts of mineral acids, which cause thickening of the dispersion. The aqueous dispersion may be applied by ordinary methods to a variety of fabrics, dried and cured by heating to form a coating having good water repellency.

DETAILED DESCRIPTION OF THE INVENTION

The essential ingredients of the present dispersion comprise, in aqueous medium, an ethylene/alpha,beta-ethylenically unsaturated carboxylic acid copolymer (preferably an ionomer), a wax, and as a cross-linking or curing agent a low molecular weight methylated melamine-formaldehyde resin. No catalyst for the curing agent is used.

The ethylene copolymers useful in this invention have an ethylene content of at least 30 percent by weight, preferably 30 to 95 percent by weight, and up to 70 percent by weight, preferably 5 to 70 percent by weight, of an alpha,beta-ethylenically unsaturated carboxylic acid. Examples of suitable alpha,beta-ethylenically unsaturated carboxylic acids are acrylic acid, methacrylic acid, itaconic acid, maleic acid, fumaric acid, and aconitic acid. Preferably the acid moiety of the copolymer will be partially neutralized, e.g., up to about 75 percent of the acid groups neutralized, with alkali metal ions. Such partially neutralized copolymers are commonly referred to as ionomers.

A particularly preferred copolymer is a copolymer of ethylene and methacrylic acid having at least 70 percent by weight of ethylene and up to 30 percent by weight of methacrylic acid. Such copolymers are generally prepared by high-pressure, free-radical catalytic processes, but they can also be prepared by low-pressure coordination catalytic processes. The molecular weight can be varied over a wide range; however, copolymers having molecular weights corresponding to melt indexes of 5 to 1,000, particularly under 100, are especially suited for use in this invention. Copoymer melt index is determined as described in ASTM D-1238-65T.

The waxes suitable for the practice of this invention can be of natural, mineral, petroleum, or synthetic origin. Natural waxes include beeswax, woolwax, Japan wax, myrtle, mace, palm kernel, spermaceti, carnauba, candellia, and bayberry; mineral waxes include materials such as Montan wax and paraffin waxes from shale oils or coal; petroleum waxes include both the paraffin and microcrystalline types; and synthetic waxes include halogenated hydrocarbons, e.g., chlorinated paraffins, polyethylene wax, alpha-olefin waxes, and Fischer-Tropsch waxes.

Preferred waxes are the paraffin waxes of petroleum origin. These materials are normally very difficult to convert into stable aqueous dispersions without downgrading many of their inherent desirable properties. These waxes are mixtures of solid hydrocarbons derived from the overhead wax distillate fraction obtained from fractional distillation of petroluem. After purification, the paraffin wax contains hydrocarbons that fall within the formulas $C_{23}H_{48}$ to $C_{35}H_{78}$. The waxes are hard, colorless, and translucent materials having melting points generally in the range from about 120° to 200° F., preferably 120° to 180° F.

Preferred chlorinated paraffin waxes are the chlorinated, saturated hydrocarbons of the $C_{10}$ to $C_{30}$ range having a chlorine content of 40 to 70 percent, as described by Hardie, "Chlorinated Hydrocarbons," in vol. 5, "Encyclopedia of Chemical Technology," page 231, Kirk-Othmer, 2nd edition, 1964. Depending upon their chlorine content, these chlorinated paraffins have melting points from −30° C. (42 percent chlorine) to 90° C. (70 percent chlorine).

The ethylene copolymer/wax dispersion can be prepared by any means known in the art. The ethylene copolymer and wax can be separately dispersed in aqueous media and then mixed or, if the copolymer is an ionomer, they can be codispersed according to the method disclosed by copending, co-assigned application Ser. No. 801,741.

The weight ratio of wax to ethylene copolymer is an important consideration because of two performance properties involved, namely, water repellency and coating adhesion (crock resistance). Water repellency, or the ability of the coated fabric to shed water, is a function of the wax content. Higher wax contents give better water repellency. The ethylene/alpha, beta-ethylenically unsaturated carboxylic acid component provides adhesion to the fabric, more specifically, the acid functionality of the copolymer provides adhesion. Therefore, it is desirable to increase the ethylene/alpha, beta-ethylenically unsaturated carboxylic acid copolymer content or, more preferably, increase the alpha, beta-ethylenically unsaturated carboxylic acid content, in the copolymer/wax combination. Obviously, both wax and alpha, beta-ethylenically unsaturated carboxylic acid content cannot be increased beyond certain limits. A workable range of weight ratios of wax to ethylene copolymer is about from 1 to 19, preferably from 1 to 6, and more preferably from 1.5 to 6.

The curing agent is a water-soluble, low molecular weight, methylated melamine-formaldehyde resin. This material is a higher molecular weight analog of hexamethoxymethylmelamine, molecular formula $$[(CH_3OCH_2)_2-N]_3-C_3N_3;$$

the latter is marketed by American Cyanamid Company under the designation "Cymel 301." Discussions on the formation of these resins are given by P. O. Powers (Kirk-Othmer, "Encyclopedia of Chemical Technology," vol. 1, Interscience Encyclopedia, Inc., New York, 1947, page 741ff), Gustave Widmer ("Encyclopedia of Polymer Science and Technology," vol. 2, Interscience Publishers, New York, 1965, pages 1–19), and H. P. Wohnsielder, "Industrial and Engineering Chemistry," vol. 44 (11), 2670 (1952). One such polymeric resin is marketed by American Cyanamid Company and is designated "Cross-linking Agent 370." While the exact chemical structure of this material is not available, it is believed to have a molecular weight corresponding to approximately 2–15 hexamethoxymethylmelamine units.

The quantity of melamine-formaldehyde resin may vary, but the dry weight ratio of ethylene copolymer/wax combination to melamine-formaldehyde resin is usually about from 1 to 75, the preferred range being 10–25 and more preferably 10–15.

While the invention can be practiced by simply using the above essential ingredients, for some applications it may be desirable to add one or more auxiliary ingredients to achieve certain performance properties, to impart color, to use the coating in a specific manner, or to use a certain specific type of equipment. Such auxiliary ingredients or additives include fillers, pigments, thickeners, and others such as are described below.

While almost any of the fillers known in the art can be used, the preferred filler types are kaolin (aluminum silicate) and talc (magnesium silicate). The preferred average particle size distribution of these fillers is 0.1 to 15 microns, more preferably from 0.1 to 10 microns, and most preferably from 0.3 to 0.8 microns. Calcium carbonate should not be used.

The quantity of filler can vary over a wide range. The clay to binder ratio (binder being defined as the total solids weight of ethylene copolymer, wax, and melamine-formaldehyde resin) may vary from about 0 to 8. The preferred ratio is 0 to 2.

Clay is desirable when it is necessary to coat an open weave or lightweight fabric because it gives bulk to the coating, helping to fill the voids.

A large variety of pigments can be successfully used in this invention. These materials are preferably aqueous dispersions of organic or inorganic pigments and should be anionic in nature. Nonionic dispersed pigments may also be employed if desired, but are not preferred.

The amount of pigment can vary with the depth of shading required, and only the ultimate user can judge his requirements. For a blue coating, the quantity of pigment required to give a bright color shade is from about 0.025 to 0.030 ounce per square yard of coated fabric. Usually below 0.025 ounce per square yard the color depth is too lean, while at greater than 0.03 ounce per square yard, pigmentation is too intense. To achieve the correct pigmentation level, one must first find out what his coating weights are with the coating system he is using and then adjust the pigment level accordingly.

To improve brightness, it is desirable to add titanium dioxide in addition to the colored pigment. Usually one uses titanium dioxide to the extent of four times the dry weight of colored pigment. Titanium dioxide is best added as an aqueous slurry of up to about 70 percent solids. For white pigmented coatings, titanium dioxide is used alone. Usually about 10 percent of the dry weight of the coating should be titanium dioxide to give an acceptably bright coating. The percentage of titanium dioxide in the coating can be raised or lowered from the 10 percent level according to the pigmentation needs of the user.

For certain coating application techniques it is desirable to increase the viscosity of the aqueous coating composition. This may be done by adding materials commonly known as thickening agents, which are viscosity modifiers. A number of these agents have been found useful for the compositions used in this invention. Examples of some materials that are useful are copolymers of methyl vinyl ether and maleic anhydride, polyethylene oxide polymers, hydroxyethyl cellulose, and polyacrylic acid polymers that have been neutralized with bases, such as ammonium hydroxide. The criteria for a useful thickener are water solubility, compatibility with the composition, and reasonable viscosity stability, the limits for which must be set by the ultimate user. Any thickener melting these criteria may be employed.

The amount of thickener needed varies according to the solids level in the coating composition and the nature of the thickener. Usually, as the solids content of the coating increases, the amount of thickener needed decreases. On the other hand, at low solids levels, the quantity of thickener may be increased to get to a certain viscosity. The usual quantity of thickener required is from 0 to 15 percent by weight of total solids, preferably from 0 to 6 percent and more preferably from 0.5 to 5 percent by weight.

It is useful in some cases to add terpolymers of ethylene/vinyl ester/alpha, beta-ethylenically unsaturated carboxylic acid for the purpose of improving adhesion or, more specifically, to improve crock resistance of the coating. Useful polymers for this application may contain from 45 to 94 percent by weight of ethylene, from 5 to 40 percent by weight of vinyl ester, and from 1 to 15 percent by weight of alpha, beta-ethylenically unsaturated carboxylic acids. Useful vinyl esters are esters of the lower aliphatic saturated acids, such as formic, acetic, and propionic acid. Examples of alpha, beta-ethylenically unsaturated carboaylic acids are acrylic, methacrylic, itaconic, and maleic acids. These polymers are added to the composition in dispersion form.

The quantity of dispersed terpolymer to be added can be varied according to the amount of crock resistance desired. A particularly useful range is from 0.2 to 1.5 dry parts by weight of terpolymer to 1 dry part by weight of ionomer/wax combination; the more preferable range is 0.5 to 1.2.

It may be desirable to add an acrylic hydrosol with a plasticizer such as octyl diphenyl phosphate, to produce a soft fabric hand. When acrylic hydrosol is added, it is essential that plasticizer be added; without plasticizer a soft hand is not obtained. A hydrosol which is useful for this application is a methyl methacrylate/ethyl acrylate/methacrylic acid terpolymer, 50/45/5, in emulsion form containing 30 percent by weight solids. A coalescing agent, such as diethylene glycol monoethyl ether, may be present in the terpolymer emulsion to the extent of about 35 percent by weight of terpolymer, based on solids. The amount of octyl diphenyl phosphate should be about 10 percent by weight based on the dry solids weight of methyl methacrylate/ethyl acrylate/methacrylic acid terpolymer.

The dry weight ratio of acrylic hydrosol to ionomer/wax is about 0.075 to 0.5, and the preferred ratio is about 0.15 to 0.3.

Other ingredients may be included as functional additives to achieve certain properties. It may be desirable to incorporate a mildewcide into the coating to prevent weakening of cellulosic fabrics by organisms. One material effective for this use is sodium pentachlorophenate monohydrate, $C_6Cl_5ONa \cdot H_2O$. When the dry weight of this material is 1 percent by weight of the total solids, resistance to organism attack of the cellulose is obtained. Lesser quantities of this component reduce resistance, and more material is not recommended because it tends to decrease the viscosity stability of the composition.

Another ingredient which may be added is an antifoaming or defoaming agent which prevents or breaks air entrainment. A variety of these agents is known to those skilled in the art. One particularly effective foam-control agent is marketed by Hercules, Inc., under the name of "Defoamer 357," a hydrocarbon-oil-based material.

This invention can be practiced in a variety of ways which will be obvious to those skilled in the art.

The type of composition prepared depends upon such considerations as method of application, coating weight desired, and desirability of using a pigmented coating. There are two basic application techniques, padding and blading. In a padding operation the fabric is immersed in a coating bath, at ambient temperature, and led through some device for removing excess coating, a set of wringer rolls, scraping bars, or some other means. Normally, but not always, the padding process utilizes a composition having a viscosity from about 5 to 1,500 cps., preferably 50 to 1,000 cps. In blade coating, a puddle of coating is placed on top of a horizontally-held fabric, and the blade is drawn through the coating over the fabric surface to give a uniform layer of coating. For this application, it is usually necessary to use a higher coating viscosity, in the range of 1,500 to 8,000 cps., preferably 2,000 to 3,000 cps. A higher viscosity is necessary to prevent the coating from soaking through to the opposite side of the fabric.

Regardless of what application method is being used, coating weights are best controlled by the solids level in the coating. A particularly useful range of coating solids is from 3 to 50 percent by weight with the preferred range being about 25 to 35 percent. The coating weight used depends upon the performance requirements. For simple water repellency, 0.1 to 0.2 oz./yd.$^2$ of dry coating may be sufficient; but, for a higher performance system, as much as 3.0 to 3.5 oz./yd.$^2$ may be desirable.

Compositions are prepared according to the type of coating system being employed. A nonpigmented type of water-repellent coating can simply be prepared by mixing the ethylene copolymer/wax dispersion with the low molecular weight methylated melamine-formaldehyde resin and adjusting the solids level to the desired degree with water. The pH should be adjusted to about 10 with aqueous ammonium hydroxide. Mixtures must be agitated to insure homogeneity. It does not appear to be necessary that the melamine-formaldehyde resin be completely dissolved in the aqueous phase; however, it should at least be uniformly dispersed.

Compositions containing clay, pigment, and thickeners may be prepared by first charging the calculated quantity of water into a suitable tank or container equipped with an agitator. Aqueous concentrated ammonia is added to adjust the pH to about 10. Coating clay is added under agitation. The mixture is agitated until the clay is completely dispersed. The wax dispersion, containing the polymeric binders, and the low molecular weight methylated melamine-formaldehyde resin are then added. If an antifoam is necessary, it should be added at this point. Agitation for 15–30 minutes is usually sufficient to blend in the wax dispersion, binders, and melamine-formaldehyde resin. The pigments are then added and blended. This step is completed when the pigmentation of the mixture is homogeneous. The final step is the addition of the thickener. Agitation of the mixture containing thickener should be conducted in such a fashion as to minimize air entrainment. Removal of the air from the thickened composition is extremely difficult. When the mixture becomes homogeneous after blending in the thickener, the composition is ready for use.

After the coating is prepared, it may be applied to the fabric in a number of ways, such as blading, padding, or any other suitable technique known to those skilled in the art. As soon as the coating is applied, it is desirable to place the coated fabric into an oven or other suitably heated zone for curing. Curing temperatures may range from 300–500° F. The curing time is related to the oven temperature. At relatively low temperatures, about 300° F., the curing time is longer than at relatively high temperatures, about 380° F. Under most conditions a curing time of 0.5 to 5 minutes is sufficient. A low solids composition may require more curing time than one having high solids because there is more water to remove from the coating. Usually in a blade-coated sample, one minute per side is a sufficient length of time to cure the coating when the oven temperature is 300° to 350° F. When padding (bath technique) is employed, 2 to 5 minutes may be required at the same temperature. At higher temperatures the curing time can be reduced, but one must use care to avoid degrading the fabric by excessive heating. Curing can be judged to be complete by determining whether the coating is wetted when a light spray of water is directed on the coating.

Normally the coated fabric is ready for use after removal from the oven, although it may be desirable to further process it by calendering in order to soften the fabric hand. This, however, is not necessary to the successful practice of this invention.

These coatings have been applied to cotton, polyester (Dacron®), and nylon fabric.

Test methods for evaluating performance of coated fabric of this invention are:

Spray rating: AATCC Test Method 22–1967 (ASTM D–583–63)
Hydrostatic pressure test: AATCC Test Method 127–1968 (ASTM D–583–63)
Crock resistance: AATCC Test Method 8–1969
Air permeability: ASTM Method D–737–69
Moisture vapor transmission rate: Described by John H. Skinkle, "Textile Testing," 2nd edition Chemical Publishing Company, Inc., Brooklyn, N.Y., 1949, pages 96–97.
Fabric stiffness test: ASTM Method D–1388

The following examples further illustrate the usefulness of this invention. Fifteen coating compositions were prepared using the procedures described above. The compositions are summarized in Table I, Part B; the chemical components of the compositions are given in Table I, Part A.

EXAMPLE 1

Composition 1 was blade coated on 6.5 oz./yd.$^2$ cotton duck and cured at 320° F. for one minute for each side of the fabric. The coating weight was 1.56 oz./yd.$^2$ (24 percent of fabric weight). The coated fabric held a 24-inch column of water without failure (hydrostatic pressure test).

EXAMPLE 2

Composition 2 was blade coated on 6.5 oz./yd.$^2$ cotton duck and cured under the same conditions as used in Example 1. The coated fabric had a spray rating of 100 and a coating weight of 1.43 oz./yd.$^2$ (22 percent of fabric weight). The point of failure in the hydrostatic pressure test (ASTM D–583–63) was 12 inches of water.

EXAMPLE 3

Composition 3 was blade coated on 6.6 oz./yd.$^2$ Dacron® polyester woven fabric and cured under the same conditions as used in Example 1. The coated fabric had a spray rating of 90, and the hydrostatic pressure test was >24 inches of water. The crock rating was 3 on a scale of 1 (worst) to 5 (no crocking).

EXAMPLE 4

Composition 4 was blade coated on 4.7 oz./yd.$^2$ woven nylon fabric and cured under the same conditions as used in Example 1. The coated fabric, which had a coating weight of 1.06 oz./yd.$^2$ (22.5 percent of fabric weight) had a spray rating of 100. In the hydrostatic pressure test, the coated fabric failed after 5 minutes under 6 inches of water.

EXAMPLE 5

Composition 5, Table I, was blade coated on 6.5 oz./yd.$^2$ cotton duck and cured under the same conditions as used in Example 1. The coated fabric, which had a coating weight of 2.4 oz./yd.$^2$ (37 percent of fabric weight) had a spray rating of 100. The hydrostatic pressure test was >24 inches of water. The flexural rigidity, ASTM Method D–1388, was >12,398 mg.-cm. The dry crock rating was 4–5.

EXAMPLE 6

Composition 6, Table I, was blade coated on 6.5 oz./yd.$^2$ cotton duck and cured under the same conditions as used in Example 1. The coated fabric had a coating weight of 2.19 oz./yd.$^2$ (33.7 percent of fabric weight) and a spray rating of 100. The hydrostatic pressure test was >24 inches of water. Both wet and dry crocking were 3–2. The moisture vapor transmission rate was 837 grams of water per 24 hours per square meter. The flexural rigidity of the coated sample was 3,688 mg.-cm.

EXAMPLE 7

Composition 7, Table I, was blade coated on 6.5 oz./yd.$^2$ cotton duck and cured under the same conditions as used in Example 1. The coated fabric, which had a coating weight of 2.11 oz./yd.$^2$ (32.5 percent of fabric weight), held greater than 24 inches of water in the hydrostatic pressure test.

EXAMPLE 8

Composition 2, Table I, was blade coated on 6.5 oz./yd.$^2$ cotton duck and cured under the same conditions as used in Example 1. The coated fabric which had a coating weight of 2.41 oz./yd.$^2$ (37 percent of fabric weight), had a spray rating of 100 and supported >24 inches of water in the hydrostatic pressure test. The flexural rigidity of the coated fabric was 5,161 mg.-cm. The crock rating was 3.

EXAMPLE 9

Composition 9, Table I, was prepared. It had a surface tension of 44.5 dynes/cm. The time required for this composition to pass through a No. 3 and No. 5 Zahn cup was 35.6 seconds and 14.0 seconds, respectively. The composition was blade coated on 6.5 oz./yd.$^2$ cotton duck and cured under the same conditions as used in Example 1. The coating weight was 1.52 oz./yd.$^2$ (23.3 percent of fabric weight). The point of failure in the hydrostatic pressure test was 18.5 inches of water.

EXAMPLE 10

Composition 10, Table I, was blade coated on 6.5 oz./yd.$^2$ cotton duck and cured under the same conditions as used in Example 1. The coated fabric, which had a coating weight of 1.95 oz./yd.$^2$ (30 percent of fabric weight), had a spray rating of 80. The hydrostatic pressure test was >24 inches of water.

EXAMPLE 11

Composition 11, Table I, was used to coat 6.6 oz./yd.$^2$ Dacron® polyester fabric by padding using squeeze rolls to remove the excess coating. In the first test using no weight on the roll, the coating weight was 1.58 oz./yd.$^2$ (24 percent of fabric weight), and the hydrostatic pressure test was >24 inches of water. Using 110 pounds of weight on the rolls, the coating weight was 0.66 oz./yd.$^2$ (10 percent of fabric weight), and the hydrostatic pressure test was 17 inches of water.

EXAMPLE 12

Composition 12, Table I, was blade coated on 6.5 oz./yd.$^2$ cotton duck and cured in the manner described in Example 1. The coated fabric, which had a coating weight of 2.08 oz./yd.$^2$ (32 percent of fabric weight), had a hydrostatic pressure test of >24 inches of water.

EXAMPLE 13

Composition 13, Table I, was blade coated on 8.5 oz./yd.$^2$ cotton fabric and cured as described in Example 1. The coated fabric, which had a coating weight of 1.91 oz./yd.$^2$ (22.5 percent of fabric weight), had a spray rating of 90–100 and a hydrostatic pressure test of 19 inches of water. This fabric had a tensile strength of 6615 lbs./in.$^2$ before soil burial and 2263 lbs./in.$^2$ after a 14-day burial.

EXAMPLE 14

Composition 14, Table I, was padded on 10.5 oz./yd.$^2$ predyed cotton fabric using 10 pounds on the wringer rolls. The fabric was cured for 2¼ minutes at 320° F. The coating weight was 0.07 oz./yd.$^2$ (0.65 percent of fabric weight). The spray rating was 100.

EXAMPLE 15

Composition 15 was blade coated on 6.5 oz./yd.$^2$ cotton duck and cured under the same conditions as used in Example 1. The coating weight was 1.17 oz./yd.$^2$ (18 percent of fabric weight). In the hydrostatic pressure test the coated fabric held 14 inches of water

TABLE I, PART A.—FORMULATION COMPONENTS

| Component | Percent solids | Symbol |
|---|---|---|
| Ethylene/methacrylic acid (89/11) copolymer a/143° F. paraffin wax (15/85) dispersion. | 56 | A |
| Ethylene/methacrylic acid (89/11) copolymer a/180° F. microwax (15/85) dispersion. | 59 | B |
| Ethylene/methacrylic acid (85/15) copolymer dispersion j. | 20 | C |
| Ethylene/vinyl acetate/methacrylic acid terpolymer (75/18/7) dispersion i. | 50 | D |
| Methyl methacrylate/ethyl acrylate/methacrylic acid terpolymer (50/45/5) emulsion containing ~30% diethylene glycol monomethyl ether. | 30 | E |
| Low molecular weight methylated melamine-formaldehyde resin b. | 80 | F |
| Number 2 coating clay | 100 | G |
| Aqueous dispersed blue pigment c | 30 | H |
| Do.d | 40 | I |
| Titanium dioxide slurry, aqueous | 70 | J |
| Methyl vinyl ether/maleic anhydride copolymer e | 15 | K |
| Polyacrylic acid, ammonium salt f | 22 | L |
| Polyethylene oxide g | 10 | M |
| Octyl diphenyl phthalate h | | N |
| Sodium pentachlorophenate | 10 | P |
| Water | | Q |
| Ethylene/methacrylic acid (85/15) copolymer dispersion k. | 50 | R | a MI 100, 75% neutralized with NaOH. Contains 5% dimerized wood rosin based on total solids.
b Crosslinking Agent 370, American Cyanamid Co.
c Imperse Blue X3221, Hercules, Inc.
d Phthalo-Blue 6-11-B-325, Hilton Davis Co.
e Thickener LN GAF Corp.
f Acrysol G-110, Rohm & Haas.
g Polyox WSRN-3000, Union Carbide.
h Santicizer 141, Monsanto Chemical Co.
j MI 60, 60% neutralized with NaOH.
k MI 60, 11% neutralized with NaOH.
MI 30. Contains 5% sodium lauryl sulfate based on total solids.

2. A dispersion of claim 1 wherein the ethylene copolymer comprises at least 70 percent by weight ethylene and up to 30 percent by weight methacrylic acid.

3. A dispersion of claim 5 wherein the carboxylic acid has from about 60 to 75 percent of its acid groups neutralized with sodium hydroxide.

4. A dispersion of claim 2 wherein the dry weight ratio of the ethylene copolymer/wax combination to melamine-formaldehyde resin is about from 10:1 to 25:1.

5. A dispersion of claim 4 wherein the dry weight ratio of wax to ethylene copolymer is about from 1:1 to 6:1.

6. A dispersion of claim 1 containing in addition an ethylene/vinyl ester/alpha, beta-ethylenically unsaturated carboxylic acid terpolymer in dry weight ratio to the ethylene copolymer/wax combination of at least 0.2.

7. A dispersion of claim 6 wherein the terpolymer comprises at least 45 percent by weight of ethylene, at least 5 percent by weight of vinyl ester and at least 1 percent by weight of carboxylic acid.

8. A dispersion of claim 7 wherein the carboxylic acid is methacrylic acid and the vinyl ester is vinyl acetate.

9. A dispersion of claim 1 wherein the ethylene copolymer comprises about 30 to 95 percent by weight ethylene and about 5 to 70 percent by weight of an alpha,beta-ethylenically unsaturated carboxylic acid.

TABLE I, PART B.—COMPOSITIONS OF WATER REPELLENT COATINGS

| | Parts by weight, wet basis | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Component symbol: | | | | | | | | | | | | | | | |
| A | 123.0 | | 118.6 | 72.5 | 87.2 | 116.7 | 101.2 | 47.7 | 112.3 | 41.3 | 67.1 | 112.5 | 118.0 | 23.1 | 114.8 |
| B | | 146.0 | | | | | | | | | | | | | |
| C | 103.3 | | 99.7 | 60.9 | | | 85.0 | 40.1 | 105.6 | 34.5 | 56.4 | 93.5 | 99.5 | 20.0 | |
| D | | | | | 73.2 | | | | | | | | | | |
| E | | | | | | 65.4 | | | | | | | | | |
| F | 8.6 | 8.9 | 8.3 | 5.1 | 8.2 | 8.2 | 2.4 | 3.3 | 8.8 | 2.9 | 4.7 | 7.9 | 8.3 | 1.8 | 9.0 |
| G | 89.6 | 93.0 | 93.0 | 56.9 | 9.20 | 91.5 | 110.5 | 149.6 | 91.0 | 32.5 | 52.6 | 88.0 | 92.5 | | 93.0 |
| H | 6.7 | 6.7 | 6.7 | 6.3 | 6.7 | 6.7 | | 6.7 | 6.7 | 5.0 | 7.5 | | 6.7 | | 6.7 |
| I | | | | | | | 5.0 | | | | | | | | |
| J | 11.4 | 11.4 | 11.4 | 6.3 | 11.4 | 11.4 | 11.4 | 11.4 | 11.4 | 8.6 | 14.3 | 28.6 | 11.4 | | 11.4 |
| K | 26.7 | 26.7 | 26.7 | 66.6 | 40.0 | 33.3 | 26.7 | 26.7 | | | 50.0 | 26.7 | 20.0 | | 26.7 |
| L | | | | | | | | | | 13.6 | | | | | |
| M | | | | | | | | | | | 80.0 | | | | |
| N | | | | | 2.0 | | | | | | | | | | |
| P | | | | | | | | | | | | | 10.0 | | |
| Q | 130.7 | 207.3 | 135.6 | 258.7 | 181.3 | 164.8 | 157.8 | 221.2 | 84.2 | 111.6 | 247.4 | 142.8 | 133.6 | 155.1 | 195.2 |
| R | | | | | | | | | | | | | | | 43.2 |
| Total | 500.0 | 500.0 | 500.0 | 533.3 | 500.0 | 500.0 | 500.0 | 506.7 | 500.0 | 250.0 | 500.0 | 500.0 | 500.0 | 200.0 | 500.0 |
| Percent solids | 40 | 40 | 40 | 25 | 40 | 40 | 40 | 39 | 40 | 30 | 25 | 40 | 40 | 9.5 | 40 |
| Viscosity, cps., 6 r.p.m | 2,000 | 800 | 2,400 | 1,300 | 2,160 | 1,900 | 7,300 | 1,500 | 1,050 | 800 | 900 | 2,200 | 400 | | 1,850 |

What is claimed is:

1. A storage-stable aqueous dispersion comprising as essential ingredients: an ethylene copolymer comprising at least 30 percent by weight ethylene and up to 70 percent by weight of an alpha,beta-ethylenically unsaturated carboxylic acid having about 0 to 75 percent of its acid groups neutralized with alkali metal ions, a wax, and a water-soluble, low moleculr weight methylated melamine-formaldehyde resin, the dry weight ratio of wax to ethylene copolymer being from about 1:1 to 19:1 and the dry weight ratio of ethylene copolymer/wax combination to melamine-formaldehyde resin being from about 1:1 to 75:1.

References Cited
UNITED STATES PATENTS

| 3,296,172 | 1/1967 | Funck | 260—29.6 H |
| 3,347,811 | 10/1967 | Bissof | 260—29.6 H |
| 3,389,109 | 6/1968 | Harmon | 260—29.6 H |
| 3,540,917 | 11/1970 | Seifer | 117—135.5 |
| 3,578,617 | 5/1971 | Louis | 117—135.5 |

MORRIS LIEBMAN, Primary Examiner

S. L. FOX, Assistant Examiner

U.S. Cl. X.R.

17—135.5, 139.5 CQ; 260—28.5 AV, 29.6 H